Nov. 23, 1965     V. MURER     3,219,322
MIXING DEVICES
Filed June 25, 1963     6 Sheets-Sheet 1

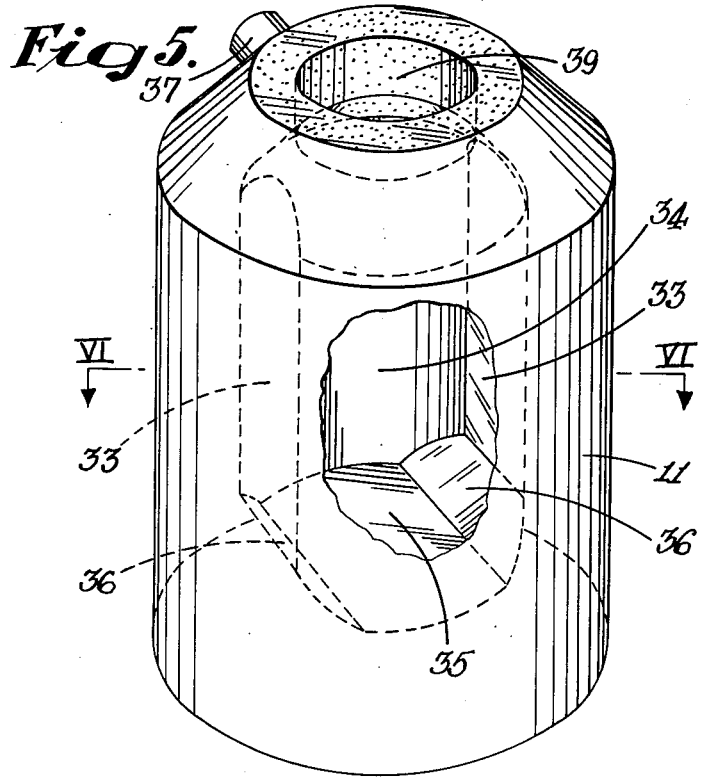
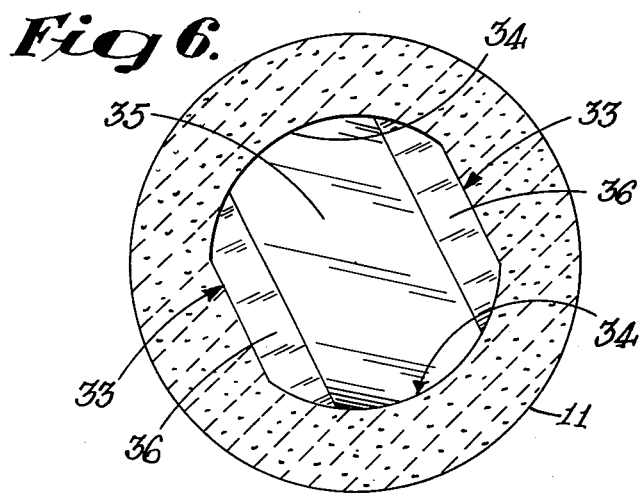

Nov. 23, 1965 V. MURER 3,219,322
MIXING DEVICES
Filed June 25, 1963 6 Sheets-Sheet 6
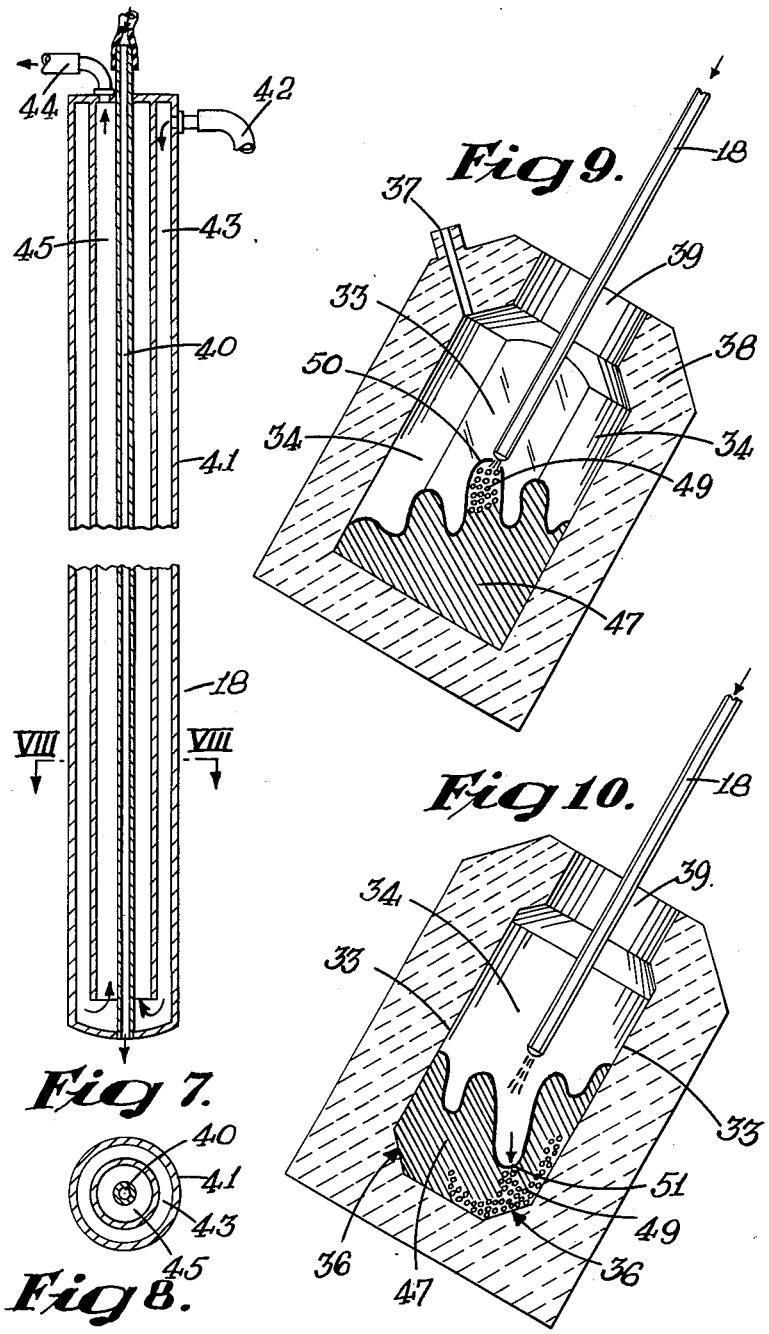

United States Patent Office 3,219,322
Patented Nov. 23, 1965

3,219,322
MIXING DEVICES
Volkmar Murer, Johannesburg, Transvaal, Republic of South Africa, assignor, by mesne assignments, to Niehaus Engineering S.A., Fribourg, Switzerland, a Swiss company
Filed June 25, 1963, Ser. No. 290,391
Claims priority, application Republic of South Africa, July 12, 1962, 2,947/62
3 Claims. (Cl. 259—89)

This invention relates to methods and apparatus for dispersing at least one first material in a mobile mass of a second material. Hereafter, when the words "first material" are employed it is to be understood that a group of first materials may be involved. The ford "mobile" is used in this specification to mean substantially free flowing of its own accord. For instance, this quality is inherent in liquids, pastes and muds; but in this case an additional requirement is that when placed in a vessel the "mobile" mass must have a tendency to slip relative to the side walls of the vessel when, for instance, the vessel is set rotating about an axis. In other words relative rotation must be set up between the vessel and the mobile mass. Gaseous materials are not included within the ambit of the second material although they are included within the ambit of the first material. Further, the term "baffle" is to be understood as indicating means in the nature of an obstacle in the path of the mobile mass which tends to deflect the material from the normal path, thereby to generate the required waves.

The phrase "dynamic balance" is used to indicate a situation in which the mixing vessel as set out in the specification and claims is balanced about its axis of rotation so that there is no net force tending to urge the vessel radially away from its axis of rotation.

An object of the invention is to provide a method of intimately contacting molten metal with oxygen or with any other suitable oxidizing gas which the applicant believes will have useful advantages in the metallurgical art. A further object of the invention is to provide apparatus for carrying out the method. The invention will clearly be capable of use in directions other than in the metallugical field as will be evident from the description following.

According to the invention a method of dispersing a first material in a mobile mass of a second material including the steps of trapping the mass in a mixing vessel, providing baffle means at or towards the peripheral walls of the vessel and fast therewith for the generation of opposed inwardly directed waves in the mass on relative rotation of the mass and the vessel about an axis of rotation disposed at an angle to the horizontal, and causing relative rotation about the axis to cause generated waves to merge into a mixing disturbance at least of the surface zone of the mass to effect dispersion of the first material in the mass.

Preferably the baffle means set up substantially radially inwardly directed waves.

Further according to the invention the required relative rotation is set up by rotating the vessel about the axis, the vessel being disposed about the axis in a substantially dynamically balanced condition.

Also according to the invention the opposed waves generated on relative rotation of the vessel and mass are brought into a condition of resonance in order to produce a single wave, at or towards the centre of the surface of the mass, of substantial amplitude in comparison to the amplitude of the individual waves generated.

According further to the invention the mixing vessel is provided with a floor so shaped as to produce peripheral up-currents in the mass transverse the line of movement of the waves generated on relative rotation of the vessel and mass.

The up-currents may be created by the generation of counter-waves generated in the mass towards the floor of the vessel by additional baffle means spaced apart around the floor and defining upwardly directed deflecting surfaces.

The invention also provides apparatus suitable for use in carrying out the method set out above, the apparatus including a mixing vessel disposed about an axis of rotation at an angle to the horizontal, and baffle means at or towards the peripheral walls of the vessel for the generation, when the vessel and a mass of mobile material trapped therein are brought into a condition of relative rotation about the axis, of opposed radially inwardly directed waves in the mass for creating a mixing disturbance of at least the surface zone of the mass. Preferably the vessel is mounted for rotation about the axis, the vessel being disposed about the axis in substantially dynamically balanced condition.

In the preferred examples of the apparatus the floor region is so shaped as to produce peripheral up-currents in the mass transverse the line of movement of the waves when the vessel and mass are brought into a condition of relative rotation. The floor may be provided with additional baffle means spaced apart around the floor and defining upwardly directed deflecting surfaces.

According further to the invention the peripheral walls of the vessel are substantially axially disposed relative to the axis of rotation and collectively define at least two substantially symmetrically disposed flat surfaces constituting the baffle means, the flat surfaces being flanked by curved wall sections leading into the flats.

The vessel, in some examples, is characterised by a floor which slopes upwardly, at least in the peripheral regions, to merge into the axially disposed flat surfaces.

A further feature fo the invention is a cradle which is tiltable about a horizontal axis to discharge the contents of the vessel.

A loading aperture is preferably provided at the top of the vessel which is co-axial with the axis of rotation, the loading aperture also acting to permit the location of an oxygen lance in the vessel.

In order to illustrate the invention an example is described hereunder with reference to the accompanying drawings in which:

FIGURE 5 is a perspective view of the mixing vessel used in the apparatus;

FIGURE 6 is a plan of the mixing vessel on the line VI—VI of FIGURE 5;

FIGURE 7 is a sectional elevation through the type of oxygen lance used;

FIGURE 8 is a section on the line VIII—VIII of FIGURE 7;

FIGURE 9 is a section through the mixing vessel with an oxygen lance in position and showing the type of disturbance of the material set up in the vessel; and FIGURE 10 is a similar view to that of FIGURE 9, this additional view being used for the purpose of illustrating the method by which dispersion of oxygen in a molten metal mass is achieved.

In the example under consideration molten metal is to be subjected to intimate contact with oxygen supplied through an oxygen lance.

Figure 1:
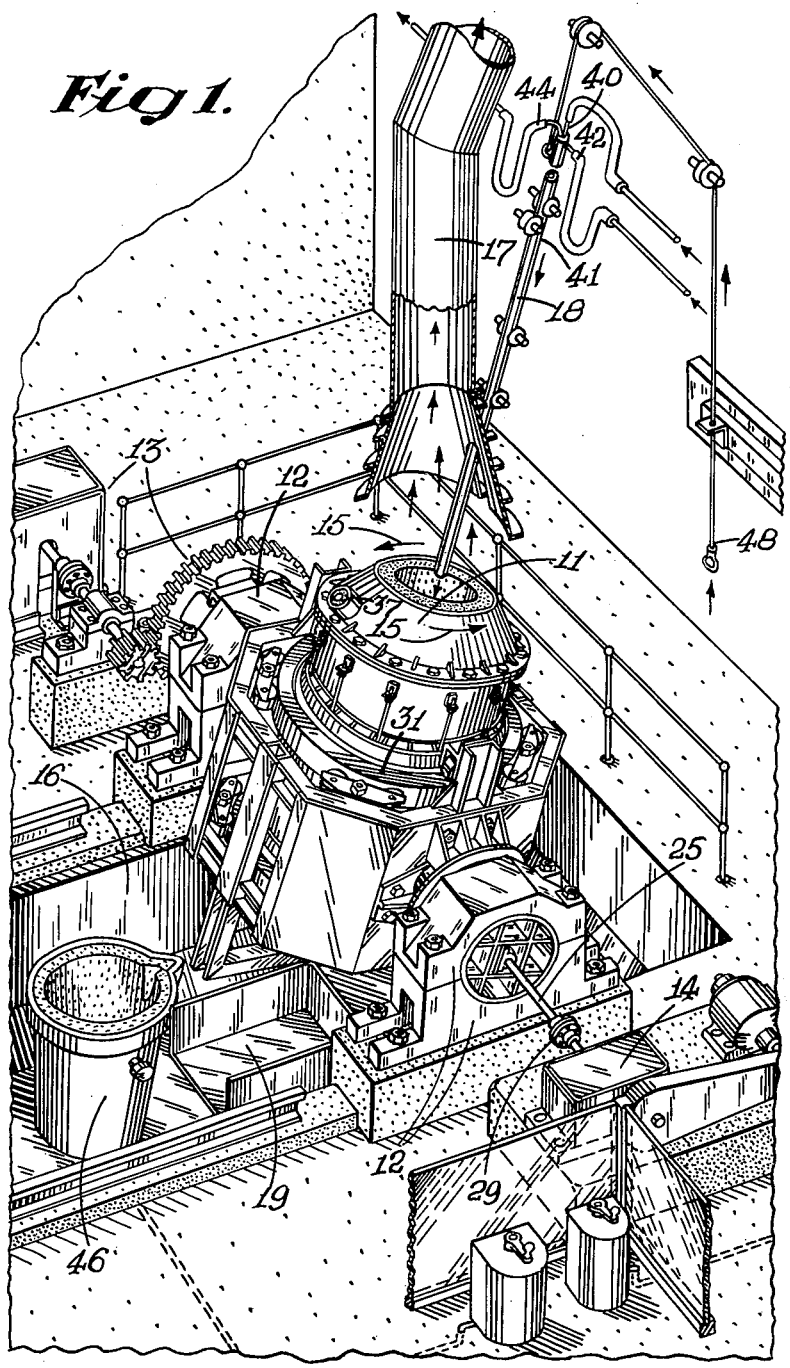
FIGURE 1 is a general perspective view of apparatus in accordance with the invention with parts broken away.

Referring to FIGURE 1, the apparatus includes a mixing vessel 11 which is tiltable about a horizontal axis, bearing supports 12 from the vessel, means 13 to tilt the vessel about its horizontal tilting axis, means 14 to rotate the vessel about an axis in the direction of arrows 15, pit 16 deep enough to permit the vessel to be upturned for the purpose of emptying the contents thereof, a flue 17 for the removal of gases generated in the interior of the vessel and an oxygen lance 18.

Figure 2:
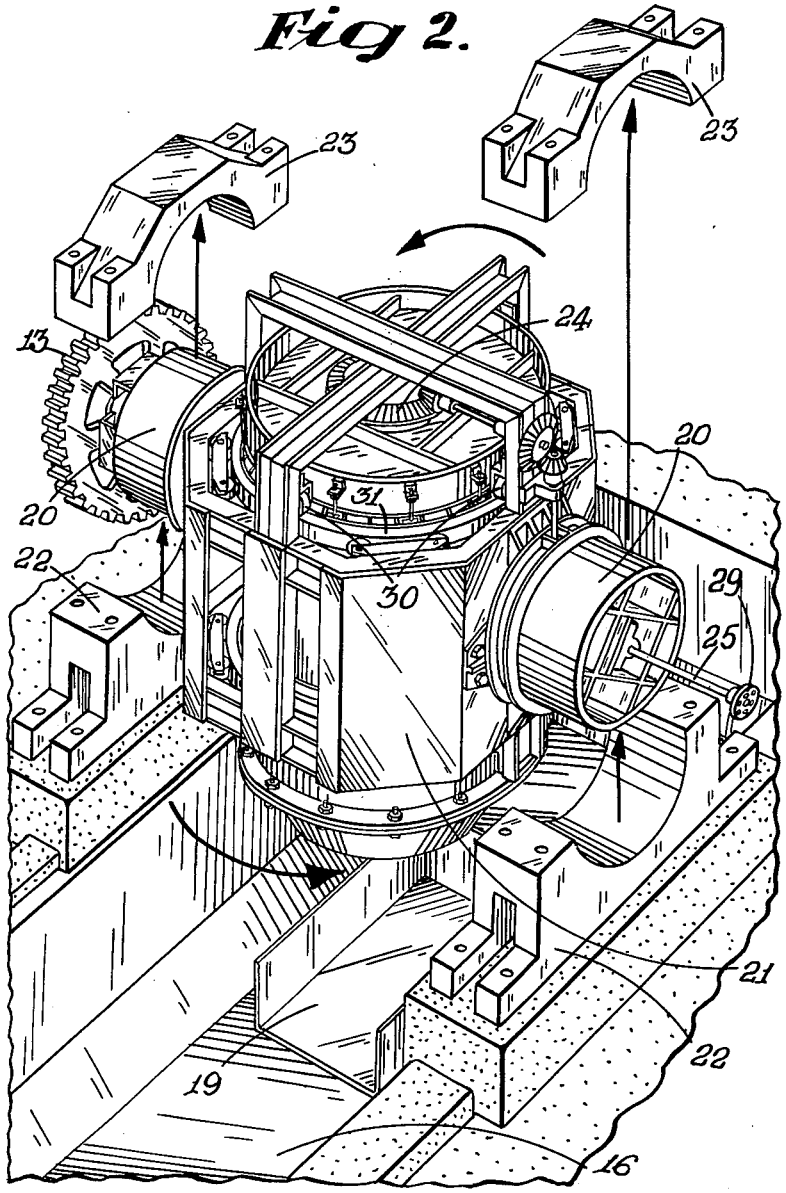
FIGURE 2 is a further perspective view of the apparatus again with parts broken away.

FIGURE 2 shows the mixing vessel in the upturned state discharging its contents onto a tray 19 located on the floor of the pit 16. In this figure, the block type bearings 12 are shown opened up to reveal drum type bosses 20 which are fast with a vessel supporting cradle 21. The bosses rotate in the cylindrical bearing apertures defined between the bearing sections 22 and 23 of the bearing supports 12, and the vessel is constrained in the cradle 21 for rotary movement in the direction of arrows 15 as illustrated in FIGURE 1.

Figure 3:
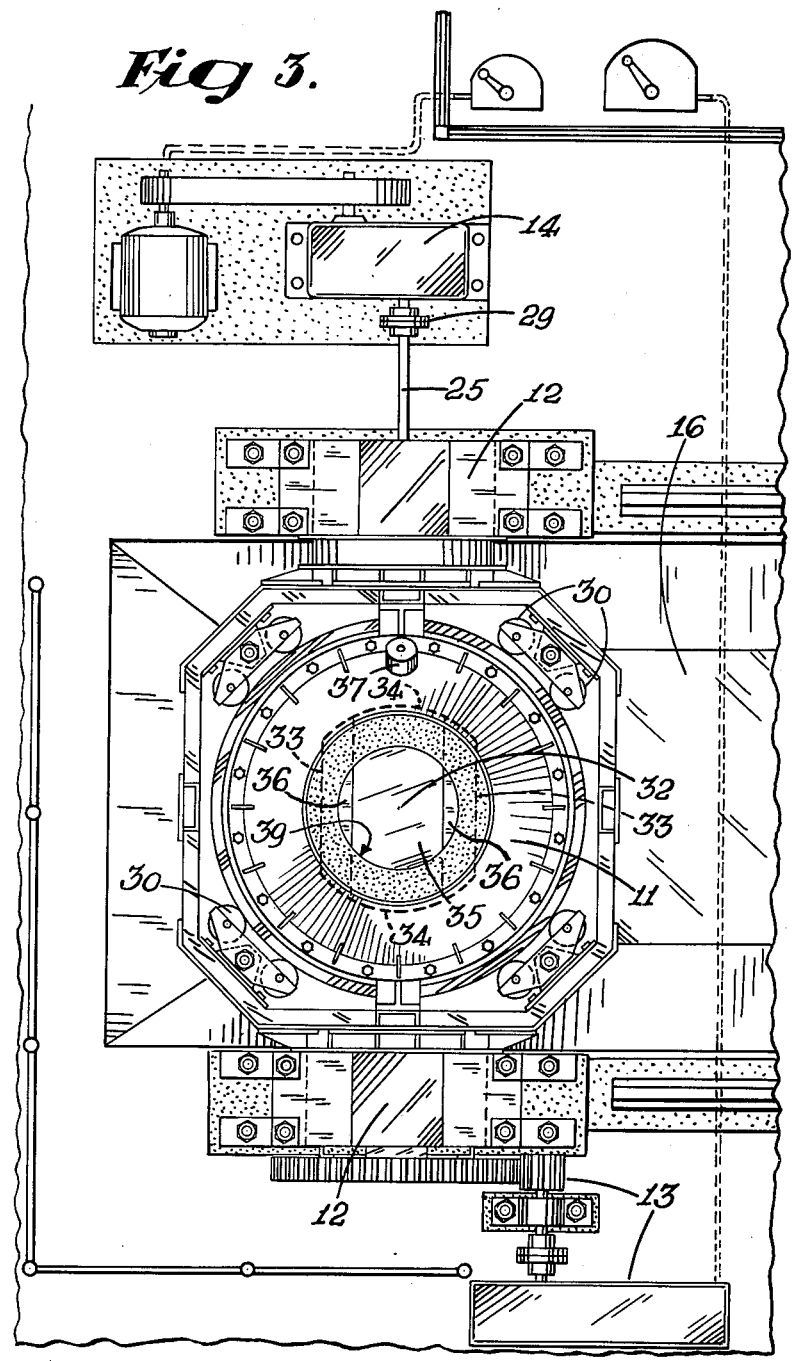
FIGURE 3 is a plan of the apparatus.
Figure 4:
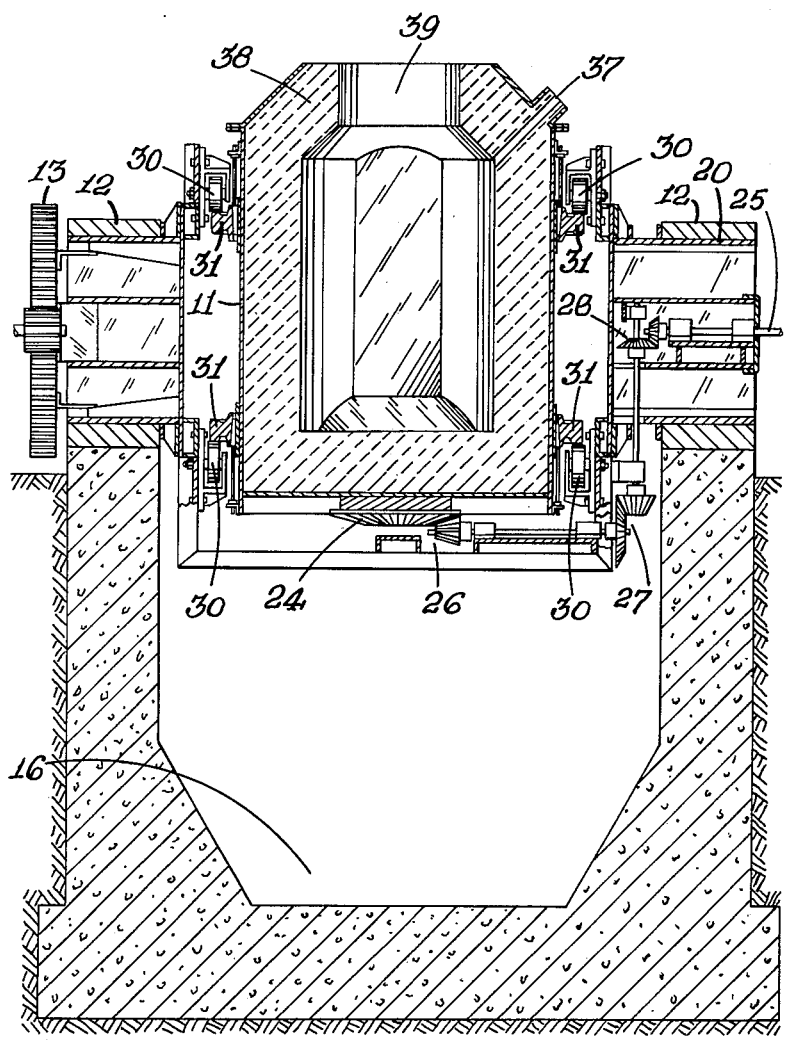
FIGURE 4 is a sectional elevation of the apparatus on a line passing centrally through the mixing receptacle.

Cradle 21 defines a framework in which the vessel is located, and the vessel is rotated by shaft 25 which engages the vessel through suitable gear arrangements 26, 27 and 28. Shaft 25 passes centrally through the right-hand drum boss 20 and is coupled by coupling 29 to rotating means 14. FIGURE 4 is a section which shows clearly the mode of mounting the vessel in the cradle 21, the vessel being seen to be equipped at its base with a bevelled gear 24 forming part of the gear arrangement 26. The cradle is equipped with two series of rollers 30 which engage mating formations 31 on the side walls of vessel 11 and act to support the vessel rotatably and captively in the cradle. A further series of rollers 30 act to provide side support for the vessel and the disposition of these latter rollers is seen in the plan view shown in FIGURE 3.

Vessel 11 is peculiar in regard to the shape of its interior. In the example under consideration the inner side walls of the vessel are symmetrically disposed about the axis about which the vessel is to be rotated, in other words, an axis passing through the centre of the vessel and as indicated by the reference 32 in FIGURE 3. These inner side walls include two directly opposed flat zones 33 extending in the axial direction of the vessel and two curved zones 34 which lead into the flats. In addition, the floor 35 of the vessel is flat in its central region but has two upwardly sloping flanking sections 36 which merge into the flats 33 of the side walls. FIGURE 9 is a section taken in a central plane parallel to the flats 33 and the flanking sections or flanking baffles 36, while FIGURE 10 is taken in a plane perpendicular to the flat baffles 33 and the flanking baffles 36.

The provision of the baffle arrangements 33 and 36 is of critical importance in the functioning of the method and apparatus of the invention, as will be described later in the specification.

In the example under consideration the vessel 11 is suitably lined with fire-bricks and a pouring spout 37 is provided towards the throat zone 38 of the vessel.

In treating metal, for instance in a process for the removal of, say, vanadium from molten pig iron, where the molten bath of metal must be brought into intimate contact with oxygen, inter alia, the loading aperture 39 of the vessel is a convenient place for inserting oxygen lance 18. The type of lance employed is preferably one in which a central air passage 40 is surrounded by a chamber 41 for circulating cooling fluid, cooling fluid entering at point 42 to cool the lance and moving down an outer passageway 43 before being deflected upwardly to an exhaust point 44 in an inner passageway 45.

The vessel operates at an angle to the horizontal and its operating position is shown clearly in FIGURES 9 and 10. Loading of the vessel is accomplished by tilting a batch of molten metal in a ladle 46 into the vessel through the loading aperture 39. When loading is taking place the flue 17 and lance 18 are moved clear of the loading aperture 39.

With the vessel charged with a mass 47 of molten metal (which in the claims qualifies as the second material), the lance 18 is brought into the position shown in FIGURES 9 and 10 with the flue mouth over the loading aperture but spaced slightly therefrom. Insertion and retraction of the lance from the vessel is effected by lever means 48 located adjacent the equipment.

By rotating the vessel about axis 32 a certain difference in the linear speeds of the molten metal and the peripheral side walls of the vessel is established, this difference depending, inter alia, upon such aspects as the viscosity of the molten metal. This means that there is relative circumferential movement between the side walls of the vessel and the molten metal about the axis 32, and this being the case the flat baffles 33 act as wave generators in the metal bath. In the example under consideration the waves generated by the flat baffles 33 are substantially oppositely opposed and they are also substantially radially inwardly directed. The effect of the two equal and opposite waves or wave trains generated by the flats is to cause a disturbance at least of the surface zone of the metal bath in the vessel, and where the metal bath is of no great depth this disturbance is likely to be of a substantial nature. Reference to FIGURES 9 and 10 will illustrate the type of disturbance which the waves create when they merge in the central region of the bath surface. In the example under consideration, and in accordance with tests carried out on transparent vessels, a speed of rotation of the vessel exists at which resonance will occur, and at this stage it appears that the opposed waves or wave trains will merge into a single wave at the centre of the bath surface of substantial amplitude in comparison to the amplitudes of the individual waves generated by the flat baffles 33. The effect of a wave of high amplitude is to entrap oxygen or oxidizing gas bubbles 49 from the lance at high peaks 50 in the wave and to discharge these bubbles in the valleys 51 deep in the molten mass. The bubbles are then distributed or scattered through the mass and the flanking baffles set up pulses which drive the bubbles upwardly in up-currents transverse the line of generation of the waves generated by baffles 33.

In order to obtain ideal conditions for mixing the oxygen in the bath there is a critical speed of rotation of the vessel and this speed is dependent upon the shape of the interior of the vessel, upon the contents of the vessel, upon the quantity of material poured into the vessel for treatment and in many circumstances on the angle at which the vessel is rotated. This critical speed or a speed close enough to the ideal can, however, be determined fairly rapidly before full-scale operations are commenced. For instance, before the lance is inserted into the vessel a preliminary run may be made to determine visually the type of wave formation being developed in the body of the mass trapped in the bath, and the speeds may be adjusted until the ideal is reached. In any event the collision of opposed waves in the mass is generally capable of producing such a disturbance as to ensure that the oxygen or other oxidizing gas is scattered about in the mass. But the value of a high amplitude wave will be clear from the above description.

Substantial tests have been made for the purpose of extracting vanadium from vanadium carrying pig iron and the yields have been extremely satisfactory; high ninety percent extractions being regularly achieved.

Many more examples of the invention exist each differing from the other in matters of detail only. Thus, in a further example of the invention, three spaced baffles 33 are employed so that three wave trains are generated in the bath and the three waves then merge to create the desired disturbance in the central regions of the bath.

It will be understood that when reference is made to the material treated in the bath being of a mobile character it is intended to signify that it must possess the quality of being capable of slipping relative to the bath side walls. In other words the necessity for relative movement between the mass and the vessel walls must be maintained if the baffles are to be able to generate the required waves in the mass.

Yet a further example of the invention is one in which the mixing vessel is held stationary while the mobile mass within the vessel is urged into a state of rotation in order to achieve the required condition of relative rotation in order to set up wave generation.

I claim:
1. Apparatus for dispersing a first material in a mobile mass of a second material comprising: a mixing vessel mounted for rotation about an axis at an angle to the horizontal, a floor region of the mixing vessel including upwardly directed deflecting surfaces to produce peripheral up-currents in the mass transverse to a line of movement of waves of the mass when the vessel and mass are brought into a condition of relative rotation, peripheral side walls of the mixing vessel substantially symmetrically disposed and parallel relative to the axis of rotation which side walls include at least two substantially symmetrically disposed and substantially flat surfaces, the flat surfaces being flanked by curved wall sections leading into the flat portions of the surfaces, so that when the vessel and the mass of mobile material trapped therein are brought into a condition of relative rotation about the rotational axis, oppositely directed waves in the mass create a mixing disturbance of at least the surface zone of the mass.

2. The apparatus claimed in claim 1 in which the vessel floor slopes upwardly, at least in the peripheral regions, to merge into the symmetrically disposed flat surfaces.

3. A method of dispersing a first material in a mobile mass of a second material including the steps of generating oppositely disposed inwardly directed waves in the mass upon relative rotation of the mass in a mixing vessel, causing the generated waves to merge into a mixing disturbance of at least the surface zone of the mass to effect dispersion of the first material in the mass, and bringing the generated waves into a condition of resonance in order to produce a single wave near the center of the surface of the mass, the single wave being of substantial amplitude in comparison to the amplitude of the remaining waves generated.

References Cited by the Examiner
UNITED STATES PATENTS

| | | | |
|---|---|---|---|
| 746,629 | 12/1903 | Geer | 259—89 |
| 927,516 | 7/1909 | Emerick | 259—89 X |
| 984,694 | 2/1911 | Morgan | 259—171 |
| 1,328,119 | 1/1920 | Brayman | 259—81 |
| 3,137,327 | 6/1964 | Muench | 259—3 X |

FOREIGN PATENTS

| | | |
|---|---|---|
| 327,688 | 3/1958 | Switzerland. |

WALTER A. SCHEEL, *Primary Examiner.*